Oct. 7, 1930.  A. E. DOMAN  1,777,963
REGULATING SYSTEM FOR VARIABLE SPEED DYNAMO ELECTRIC MACHINES
Filed Feb. 20, 1929
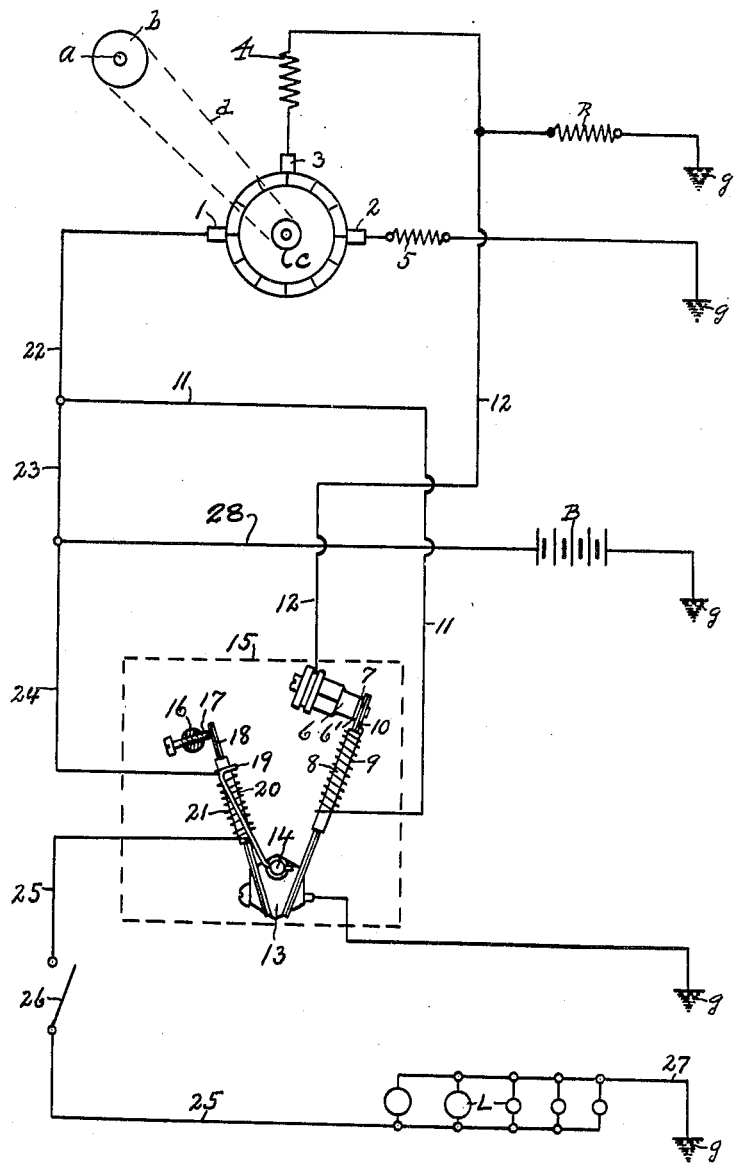
INVENTOR.
A. E. Doman
BY
Denison & Thompson
ATTORNEY.
WITNESS
J. J. Mains Patented Oct. 7, 1930

1,777,963

UNITED STATES PATENT OFFICE

ALBERT E. DOMAN, OF SYRACUSE, NEW YORK, ASSIGNOR TO OWEN-DYNETO CORPORATION, OF SYRACUSE, NEW YORK, A CORPORATION OF NEW YORK

REGULATING SYSTEM FOR VARIABLE SPEED DYNAMO-ELECTRIC MACHINES

Application filed February 20, 1929. Serial No. 341,425.

This invention relates to an electric regulating system for variable speed dynamo electric machines commonly known as "generators", adapted to be used more particularly in connection with an internal combustion engine and a storage battery of a motor vehicle for ignition, lighting, starting and charging purposes, but it will be evident from the following description that certain features of the invention may be used to regulate the voltage or current output of any variable speed dynamo or to regulate the charging current through any storage battery or through any one or more translating devices receiving current from any electric current generator having a widely variable voltage or current output.

The main object is to provide simple and efficient means for automatically regulating the current output or voltage of any generator within certain limits of safety according to the limitations of the device which is to receive said current.

In the use of a dynamo electric machine and storage battery in connection with a motor vehicle in which the dynamo is driven by an internal combustion engine, the current output or voltage varies, of course, with the varying speeds of the engine, and in many systems where the dynamo and battery are both used for lighting and ignition purposes and the battery is automatically charged by the dynamo current, the current output and voltage of the dynamo is increased more or less as the charging of the battery increases to or beyond its full charge limit and is further increased by the diversion of a greater current through the shunt winding of the dynamo, all of which, if not properly regulated, frequently results in overheating, overcharging, and consequent impairment or destruction of the battery.

I have found that a dynamo electric machine of the "third brush type" is most satisfactory and efficient for this particular work in that it automatically regulates, to a certain extent, the current output under widely varying speeds, but, when charging the battery, as the latter becomes more fully charged, instead of gradually reducing the charge as desired as the charging progresses and battery voltage increases, it actually increases the charging rate which if continued under certain conditions will eventually ruin the battery by overheating as a result of overcharging.

In addition to the objects set forth in my Patent No. 1,498,077, June 17, 1924, the main object of the present invention provides simple and efficient means affected by the load in the power circuit to delay the opening of the thermostatic switch and thereby to increase the current output of the generator at such times as any load is used, without in any way effecting the automatic regulation of the current output within safe battery charging limits.

In carrying out this automatic regulation of the current output of the generator the operation of the thermostatic switch under widely varying atmospheric temperatures is controlled by a supplemental thermostat coordinated with the thermostatic switch in such manner as to prevent the opening of the switch under relatively high atmospheric temperatures.

One of the objects of the present invention is to associate with the supplemental thermostat a heating element connected in the power circuit in series with the load and in heat transfer relation to said supplemental thermostat so that the rise of temperature of the heater will cause a deflection of the thermostat in the direction of deflection of the switch thermostat for dalaying the opening of the switch, and to oppose the deflection of the supplemental thermostat by a suitable spring or equivalent means which also acts upon the thermostatic switch tending to close the same.

Another object is to mount both of the thermostats upon a pivoted support for simultaneous movement in the same direction about the axis of the pivot under like temperatures or under rising temperatures of their respective heaters.

Other objects and uses relating to specific parts of the regulating system will be brought out in the following description.

The drawing represents a diagrammatic view of a current regulating system for variable speed dynamos of the third brush type embodying the various features of my invention.

In order that the invention may be clearly understood I have shown the commutator A of a variable speed dynamo or equivalent electric machine adapted to be driven by the crank shaft or other rotating part —a— of an internal combustion engine through the medium of pulleys —b— and —c— and a belt —d— connecting said pulleys.

Associated with the commutator —A— is a plurality of brushes —1—, —2— and —3—, the brushes —1— and —2— forming parts of the main power circuit including therein a load —L— representing a series of lights or other translating devices commonly used in motor vehicles.

The brushes —3— and —2— constitute a shunt circuit including therein a shunt field winding —4— and a resistance —R— and if desired a series winding —5—, all of said circuits being grounded at —g—.

A storage battery —B— is connected in parallel with the power circuit of the dynamo for receiving current therefrom for charging purposes and also for supplying current to the translating devices —L—.

A thermostatic switch including cooperative contacts —6— and —6'— and a thermostatic bar —7— are connected in the shunt field circuit between the shunt field winding —4— and resistance —R— and upon this bar —7— is mounted an insulating sleeve —8— around which is wound an electric heating coil —9— having one end electrically connected at —10— to the bar —7— and its other end connected by a wire —11— to the power circuit of the dynamo and storage battery.

One of the contact members —6— of the switch is preferably installed in a fixed position while the other contact member —6'— is mounted upon the free end of the thermostatic bar —7— to move therewith into and out of contact with the fixed terminal as the bar —7— is deflected in opposite directions by the rise and fall of temperature of the heater —9—.

As illustrated, the fixed terminal —6— is connected by a wire —12— to the shunt circuit between the shunt winding —12— and resistance —R— while the movable contact —6'— is in electrical connection with the bar —7— which, in turn, is mounted upon and in electrical connection with a pivoted support —13—, the latter being grounded at —g—.

That is, the thermostatic bar —7— is secured at one end to the pivoted support —13— which is mounted for oscillating movement upon a relatively stationary pivotal pin or post —14— for a purpose presently described, the switch member —6'— being normally in contact with the switch member —6— when the thermostatic bar —7— is under normal temperature.

The pivotal post —14— may be mounted upon a suitable supporting frame or base —15— shown by dotted lines and upon this frame or base is mounted a relatively stationary post —16— carrying an adjustable stop —17— which is engaged in a threaded opening in the post —16—.

An additional thermostatic bar —18— is secured at one end to the oscillatory support —13— preferably at an acute angle to the other thermostatic bar —7— and has its free end normally spring pressed against the stop —17— by means of a spring —19— carried by the pivot post —14—.

It will be noted that the fixed switch terminal —6— and stop —17— are located at corresponding sides of their respective thermostatic bars —7— and —18—, said bars being preferably of the laminated type and are arranged to deflect away from their respective stops under like temperatures or when heated.

The intermediate portion of the thermostatic bar —18— is surrounded by a sleeve —20— of insulating material against which the free end of the spring —19— is adapted to bear and upon which is mounted an electric heating coil —21—.

This heating coil is connected in the power circuit of the generator —A— and storage battery —B— in series with the load —L—.

For example, the dynamo power circuit passes from the brush —1— through wires —22—, —23— and —24— through the heater coil —21— and thence through wires —25— and hand switch —26— to one side of the translating device —L— and thence through wire —27— to the ground —g— to return to the brush —2— of the dynamo.

The battery power circuit is taken from one pole of the battery through wire —28— to the wire —24— and through the heater coil —21— and wires —25— to one side of the translating devices —L— and return through the wire —27— and ground —g— to the other side of the battery.

The dynamo current used for charging the battery passes from the brush —1— through wires —22—, —23— and —28— to one pole of the battery to return from the opposite pole of said battery through the ground to the other terminal —2— of the dynamo.

The resistance —R— is selected to assist in regulating the current output of the dynamo to a safe degree for battery charging purposes and is automatically cut into and out of the shunt circuit through the operation of the thermostatic switch including the thermostatic bar —7—.

That is, under normal or safe current output of the dynamo generator the thermostatic switch will remain closed but if this current output exceeds a predetermined amount it will heat coil —9— and thermostatic bar —7— thereby deflecting the free end of the bar to open the switch and thereby cut in the resistance —R— to reduce or prevent excessive current output of the dynamo generator.

It sometimes happens that an excessive load will be thrown upon the power circuit at about the time the current output of the dynamo is approaching its maximum safe charging limit thereby requiring an increased current output to satisfy the load demand and, in order that this increased current output may be supplied, suitable means is provided for delaying the opening deflection of the thermostatic bar —7—, said means consisting, in this instance, of the heater coil —21— in heat transfer relation to the thermostatic bar —18— whereby the increased output of the dynamo generator tends to heat said coil and thereby to deflect the free end of the bar 18 in the same direction about the axis of the pivot 14 as the deflection of the bar —7—. This deflection of both thermostatic bars is counter-acted by the force of the spring 19 which serves to shift both bars and their pivoted support 13 in a counter-clockwise direction thus keeping the bar —18— in contact with the stop —17— and at the same time maintaining the thermostatic switch in its closed position for short circuiting the resistance —R— in the shunt circuit and thereby causing an increased current output to meet the load demand.

It is obvious, however, that this prolonged closing of the switch is partially regulated by the adjustment of the stop screw —17— but mainly by the degree of temperature of the heater coil —9— which directly effects the amount of deflection of the thermostatic switch bar —7—.

Under these conditions if the current output exceeds a safe battery charging degree the thermostatic bar —7— will be deflected from its switch-closing position to an open position for cutting in the resistance —R— and thereby regulating the further increased output of the dynamo generator.

It is now evident that the thermostatic switch including the heater coil —9— serves to limit the current output of the dynamo generator within a safe battery charging amount while the other thermostatic bar —18— including its heater —21— serves to regulate the operation of the thermostatic switch according to the load demand within, of course, safe charging limits.

The construction shown and described is simple and highly efficient in its operation, but obviously various changes may be made in the detail construction and arrangement of various parts of the system without departing from the spirit of this invention.

I claim:

1. The combination with an electric dynamo having a main power circuit and a shunt circuit including therein an electrical resistance, means including a thermostatic switch for cutting the resistance into and out of the shunt circuit, an electric heating element deriving current from the main circuit for controlling the operation of the switch, and means including an electric heating element connected in the main circuit in series with the load therein for delaying the opening of the thermostatic switch by the first-named heating element.

2. The combination with an electric dynamo having a main power circuit and a shunt circuit including therein an electrical resistance, means including a thermostatic switch for cutting the resistance into and out of the shunt circuit, an electric heating element deriving current from the main circuit for controlling the operation of the switch, an electric heating element in the main circuit in series with the load therein, and thermostatic means influenced by the second-named heater for delaying the opening of the switch when both heaters are energized.

3. The combination with the power circuit and third brush circuit of a three-brush dynamo, of separate heating elements energized by the power circuit, a thermostatic switch in heat-transfer relation to one of said elements and tending to open the switch when the temperature exceeds a predetermined degree, and means influenced by the heating of the other element for delaying the opening of said switch.

4. The combination with the power circuit and third brush circuit of a three-brush dynamo, of separate thermostatic members and a pivoted support therefor spring-pressed in one direction for simultaneously moving said members in the same direction about the axis of the pivot, cooperative contacts in the third brush circuit controlled by one of said members, an electric heating element deriving current from the power circuit and in heat transfer relation to the last-named member for exerting a deflecting movement thereof tending to separate said contacts as the temperature exceeds a predetermined degree, and a separate electric heating element in heat-transfer relation to the other thermostatic member for exerting a deflecting movement thereof in the direction of deflection of said last-named member for delaying the separation of the terminals.

5. The combination with the power circuit and third brush circuit of a three-brush dynamo, of separate thermostatic members and a pivoted support therefor spring-pressed in one direction for simultaneously moving said members in the same direction about the axis of the pivot, said members being adapted when heated to deflect in a direction opposite to that produced by the spring, means for limiting the movement of said support in the first-named direction, separate electric heating elements, one for each member deriving current from the power circuit, each heating element being in heat transfer relation to its thermostatic member for heating the same, and cooperative contacts in the third brush circuit controlled by one of said members.

6. The combination with the power circuit and shunt field circuit of a variable speed dynamo, of a self-closing electric switch including a thermostatic bar adapted when heated to be deflected in one direction for opening the switch, electrical means in the power circuit for heating said bar, a pivoted support for said bar spring-pressed in a direction opposite to the direction of deflection of said bar, and means for limiting the movement of said support in the last-named direction.

7. The combination with the power circuit and shunt field circuit of a variable speed dynamo, of a self-closing electric switch including a thermostatic bar adapted when heated to be deflected in one direction for opening the switch, electrical means in the power circuit for heating sail bar, a pivoted support for said bar spring-pressed in a direction opposite to the direction of deflection of said bar, an additional thermostatic bar mounted on the support to move therewith and adapted under rising atmospheric temperature to deflect in the direction of deflection of the first-named bar, and means for limiting the movement of said support by the spring.

8. The combination with the power circuit and shunt field circuit of a variable speed dynamo, of a self-closing electric switch including a thermostatic bar adapted when heated to be deflected in one direction for opening the switch, electrical means in the power circuit for heating said bar, a pivoted support for said bar spring-pressed in a direction opposite to the direction of deflection of said bar, an additional thermostatic bar mounted on the support to move therewith and adapted under rising atmospheric temperature to deflect in the direction of deflection of the first-named bar, means for limiting the movement of said support by the spring, and an electric heater in the power circuit in heat transfer relation to the additional bar for additionally deflecting said bar and thereby delaying operation of the first-named bar sufficient to open the switch.

9. In a current regulator for a variable speed dynamo electric machine, a pivoted support having two thermostatic bars movable therewith about the axis of the pivot and adapted under similar atmospheric temperatures to deflect in the same direction about said axis, means normally urging said support and bars in the opposite direction, means limiting the last-named movement, a circuit breaker controlled by one of said bars, and an electric heater receiving current from the dynamo and in heat transfer relation to the last-named bar for deflecting the same sufficiently to open the circuit breaker when the temperature of the heater exceeds a predetermined degree.

10. In a current regulator for a variable speed dynamo electric machine, a pivoted support having two thermostatic bars movable therewith about the axis of the pivot and adapted under similar atmospheric temperatures to deflect in the same direction about said axis, means normally urging said support and bars in the opposite direction, means limiting the last-named movement, a circuit breaker controlled by one of said bars, an electric heater receiving current from the dynamo and in heat transfer relation to the last-named bar for deflecting the same sufficiently to open the circuit breaker when the temperature of the heater exceeds a predetermined degree, and an additional electric heater receiving current from the dynamo and in heat transfer relation to the other bar to cause a deflection thereof for delaying the opening of the circuit breaker.

11. The combination with a variable speed dynamo of the "third-brush" type having a power circuit, a third-brush circuit including therein a normally short-circuited electrical resistance, an electric heater connected across the load brushes of the dynamo means controlled by the heater for cutting in said resistance, and means controlled by the current output in the power circuit for delaying the operation of the first-named means.

12. The combination with a variable speed dynamo electric machine, of a regulator including a heating coil in the dynamo circuit, a normally closed electric thermostat in said circuit and in heat-receiving relation to said coil to cause it to be opened by the heat therefrom, an additional thermostat operatively connected to the first-named thermostat to oppose the opening thereof under like atmospheric temperatures and to permit said opening by the heat of the coil, and an electric heater in the power circuit in heat transfer relation to the additional thermostat for delaying the opening of the first-named thermostat.

13. The combination with a variable speed dynamo electric machine, of an automatic voltage regulator therefor including an electric switch, and two thermostatic members connected to move in unison in reverse directions and normally urged in one direction to close the switch, means for limiting the movement of said members toward their switch-closing positions, and an electric heater in heat-transfer relation to one of said members and adapted to be energized by the dynamo current to cause the opening of the switch.

14. The combination with a variable speed dynamo electric machine, of an automatic voltage regulator therefor including an electric switch, and two thermostatic members connected to move in unison in reverse directions and normally urged in one direction to close the switch, means for limiting the movement of said members toward their switch-closing positions, an electric heater in heat-transfer relation to one of said members and adapted to be energized by the dynamo current to cause the opening of the switch, and an additional electric heater in heat transfer relation to the other member to cause a delay in the opening of said switch.

In witness whereof I have hereunto set my hand this 18th day of February, 1929.

ALBERT E. DOMAN.